(12) United States Patent
Dantkale et al.

(10) Patent No.: US 9,170,928 B1
(45) Date of Patent: Oct. 27, 2015

(54) I/O SCHEDULING AND LOAD BALANCING ACROSS THE MULTIPLE NODES OF A CLUSTERED ENVIRONMENT

(71) Applicant: Symantec Corporation, Mountain View, CA (US)

(72) Inventors: Suhas Dantkale, Sunnyvale, CA (US); Satyendra Thakur, Sunnyvale, CA (US); Kirubakaran Kaliannan, Beaverton, OR (US); Prasad Vadlamannati, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 44 days.

(21) Appl. No.: 14/145,875

(22) Filed: Dec. 31, 2013

(51) Int. Cl.
*G06F 3/00* (2006.01)
*G06F 12/02* (2006.01)

(52) U.S. Cl.
CPC ...... *G06F 12/0223* (2013.01); *G06F 2212/254* (2013.01)

(58) Field of Classification Search
None
See application file for complete search history.

(56) References Cited

U.S. PATENT DOCUMENTS

| | | | |
|---|---|---|---|
| 2008/0126623 A1* | 5/2008 | Chang et al. | 710/53 |
| 2011/0060887 A1* | 3/2011 | Thatcher et al. | 711/171 |
| 2012/0137102 A1* | 5/2012 | Perumanam et al. | 711/170 |
| 2012/0324097 A1* | 12/2012 | Myers et al. | 709/224 |
| 2014/0012972 A1* | 1/2014 | Han | 709/224 |

* cited by examiner

*Primary Examiner* — Elias Mamo
(74) *Attorney, Agent, or Firm* — Brill Law Office; Jeffrey Brill

(57) ABSTRACT

Write operations are scheduled for multiple nodes in a shared storage cluster that supports volume replication. Requests are received from nodes for allocation of space for write operations in a replication log. In response to a received request, the current capacity of the requesting node to manage a backlog can be determined. The amount of space in the replication log allocated to the node is then calibrated to the node's capacity, thereby preventing self-throttling. A separate priority can be assigned to each volume, and space in the replication log assigned to each volume based on its priority. Nodes can target synchronous and other latency sensitive operations to higher priority volumes. A single global queue can be maintained to schedule write operations for all nodes, thereby providing a fair scheduling. A separate local queue can be maintained for each node, thereby providing specific levels of preference to specific nodes.

7 Claims, 5 Drawing Sheets

I/O SCHEDULING AND LOAD BALANCING ACROSS THE MULTIPLE NODES OF A CLUSTERED ENVIRONMENT

TECHNICAL FIELD

This disclosure pertains generally to clustering and storage technology, and more specifically to I/O scheduling and load balancing across multiple nodes in a clustered environment supporting data volume replication.

BACKGROUND

Clusters are groups of computers that use groups of redundant computing resources in order to provide continued service when individual system components fail. More specifically, clusters eliminate single points of failure by providing multiple servers, multiple network connections, redundant data storage, etc. Clustering systems are often combined with storage management products that provide additional useful features, such as journaling file systems, logical volume management, data volume replication, multi-path input/output (I/O) functionality, etc.

Where a cluster is implemented in conjunction with a storage management environment, the computer systems (nodes) of the cluster can access shared storage, such that the shared storage looks the same to each node. The shared storage is typically implemented with multiple underlying physical storage devices, which are managed by the clustering and storage system so as to appear as a single storage device to the nodes of the cluster. The multiple physical storage media can be grouped into a single logical unit which is referred to as a LUN (for "logical unit number"), and appears as a single storage device to an accessing node.

The management of underlying physical storage devices can also involve software level logical volume management, in which multiple physical storage devices are made to appear as a single logical volume to accessing nodes. A logical volume can be constructed from multiple physical storage devices directly, or on top of a LUN, which is in turn logically constructed from multiple physical storage devices. A volume manager can concatenate, stripe together or otherwise combine underlying physical partitions into larger, virtual ones. In a clustering environment, a cluster volume manager extends volume management across the multiple nodes of a cluster, such that each node recognizes the same logical volume layout, and the same state of all volume resources at all nodes.

Data volumes can also be replicated over a network to a remote site. Volume replication enables continuous data replication from a primary site to a secondary site, for disaster recovery or off host processing. In order for the secondary to be usable, the order of write operations (write-order fidelity) occurring at the primary must be maintained. Therefore, for volume replication in a clustering environment, the order of writes is typically maintained in a log (the replication log), and one of the nodes in the cluster is designated as the logowner.

When a node in the cluster other than the logowner wishes to write to the shared storage, the node first sends a request to the logowner node. The logowner assigns a position in the replication log for the write, and responds to the requesting node with a message indicating the assigned position. After receiving the response from the logowner, the node writes to the assigned position in the replication log, and then to the target data volume. When the logowner itself performs a write, it assigns itself a position in the replication log, writes to that position and then writes to the data volume. Thus, the order of the write operations to the volumes of the primary is preserved in the replication log. Because the log is used to replicate the writes to the secondary in first in first out order, write-order fidelity is preserved in the replication of the data volumes.

Different nodes in a cluster have different storage performance characteristics, depending upon hardware, software, the paths between the node and the storage devices and other layers in the node's storage stack. Some of these factors can also vary dynamically, depending upon the I/O load, available CPU and memory, etc. Thus, different individual nodes have different upper limits of how many outstanding I/O requests can be managed at any given time. If the number of outstanding requests reaches the upper limit, new I/O requests on that node are throttled (e.g., by the SCSI layer), thereby slowing down the node's storage I/O logarithmically. However, because the logowner node processes incoming write requests in first in first out order, an individual node making a large number of requests can be assigned more slots in the replication log than it can process without self-throttling. Because writes are made to the replication log before the shared storage in order to preserve write-order fidelity, this node level throttling can become a bottleneck that negatively impacts cluster wide I/O performance. In other words, other nodes can delayed from executing their own write operations while waiting for a self-throttled node to process its delayed operations which are over the limit of what it can simultaneously manage, even where the storage media could handle a greater I/O load.

It is also of note that the replication log typically resides on storage hardware that is faster than the storage devices backing the data volumes (e.g., a solid state drive as opposed to slower magnetic media). This is the case because the log must be fast enough to handle writes to multiple replicated volumes. Additionally, because the replication log is considerably smaller than the data volumes, it is economically feasible to use more expensive storage with better access times to back the replication log. However, the difference in performance between the replication log and data volumes causes the writes to the latter to lag behind, creating a bottleneck. The replication log contains a limited number of slots for writes, and when all of these slots are in use, incoming writes from any node must be throttled until the logged writes have been flushed to the replicated volumes. When a particular node (or a given subset of the nodes) of the cluster perform continuous I/O operations, other nodes can have their writes throttled for unacceptably long periods of time.

In either of these scenarios, a heavy I/O load from a given node of the cluster can cause the problem of I/O starvation for the other nodes. More specifically, a given node attempting to execute a sufficient number of write operations can result in self-throttling as described above. If the node is allocated more slots in the replication log can it can efficiently process, other nodes of the cluster are unable to execute their own write operations while waiting for the self-throttled node to process its delayed operations. Thus the other nodes become I/O starved, even though the storage media could handle a greater I/O load. Additionally, when the heavy I/O operations of a particular node tie up the limited capacity of the replication log, the other nodes are starved until the logged operations from the monopolizing node have been flushed to the underlying storage volumes. It is clearly undesirable for the other nodes of the cluster to be I/O starved while an individual node monopolizes the replication log.

Another issue is that because of the master/slave relationship between the logowner node and the other nodes of the cluster, the logowner node typically has less write latency than the slave nodes. Whereas the logowner can complete its own writes, other nodes must make requests to the logowner and be granted slots in the replication log as part of the write process. Yet, many applications rely on reasonably uniform throughput from all the nodes of the cluster.

Additionally, some write operations are synchronous or otherwise highly latency sensitive, whereas others are asynchronous. For operation continuity, applications can require guaranteed completion of their latency sensitive I/Os at higher levels of priority.

It would be desirable to address these issues.

SUMMARY

Write operations are scheduled for multiple nodes, and the load of storage input/output ("I/O") operations is balanced in a clustering and storage environment that utilizes shared storage and supports replication of data volumes to a secondary site. Within the clustering and storage environment, the nodes perform write operations by writing first to a replication log and subsequently to the shared storage. The clustering and storage environment utilizes the order and content of write operations to the replication log to replicate the data volumes of the shared storage to the secondary site. Because the order of write operations to the replication log matches the order of write operations to the shared storage, write-order fidelity is preserved in the volume replication.

In some embodiments, requests are received from nodes for allocation of space for write operations in the replication log. In response to receiving a request from a specific node for the allocation of space in the replication log, the current capacity of the specific node to manage a backlog without throttling execution of its own write operations is determined. In one embodiment, nodes include information indicative of current capacity in their requests for space in the replication log, and this information is gleaned from the received requests. For example, this information can be in the form of the number of outstanding storage I/O requests pending on the node, and the node's Small Computer System Interface ("SCSI") tag command queue. In another embodiment, each one of the nodes is periodically polled for the information indicative of its current capacity.

The amount of space in the replication log to allocate to specific node in response to a request is calibrated to the determined current capacity of the specific node to manage a backlog without throttling execution of its own write operations. This can take the form of allocating the specific node only enough space in the replication log to execute the number of backlogged write operations that it can simultaneously manage without self-throttling. For example, the allocation of space in the replication log can be limited to the upper limit of the specific node for simultaneous backlogged write operation management, thereby preventing the specific node from throttling its backlogged write operations above the upper limit.

In some embodiments, a separate scheduling priority is assigned to each one of the multiple data volumes of the shared storage. Space in the replication log is then assigned to each data volume based on its assigned scheduling priority, such that write operations to data volumes with higher assigned scheduling priorities are processed at a higher level of priority than write operations to data volumes with lower assigned scheduling priorities, all else being equal. In such embodiments, nodes can target their synchronous and other higher latency sensitive write operations to higher priority volumes, and target their asynchronous and other lower priority write operations to lower priority volumes. The scheduling priorities to assign to specific data volumes can be input and/or adjusted by an administrator.

In some embodiments, a single global queue is maintained to schedule write operations for all nodes of the clustering and storage environment. In this scenario, each node adds its requests to schedule write operations to the single global queue. The scheduling requests are read from the single global queue, and the write operations are scheduled in first in first out order, thereby providing a completely fair scheduling of write operations for each node.

In other embodiments, a separate local write operation scheduling queue is maintained for each one of the nodes of the clustering and storage environment. Each node then adds its requests to schedule write operations to its own local write operation scheduling queue. The scheduling requests are read from each separate local queue in first in first out order for that specific queue. Because each node has its own scheduling queue, the write operations can be scheduled so as to provide specific levels of scheduling preference to specific ones of the nodes. For example, in one embodiment equal scheduling preference is provided to each node, by allocating each node a substantially equal amount of space in the replication log. This can take the form of periodically dividing available space in the replication log substantially equally between each node. In another embodiment, each node is provided a level of scheduling preference in direct proportion to the number of requests for write operations in the specific node's local write operation scheduling queue. In this embodiment, the more operations a node has queued up for scheduling, the greater the priority the node is given. In some embodiments, an administrator can enter or adjust scheduling preferences for specific nodes. In some embodiments, information indicative of the priority of a specific write operation can be included in a corresponding request for allocation of space in the replication log, in which the case write operation can be scheduled accordingly.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
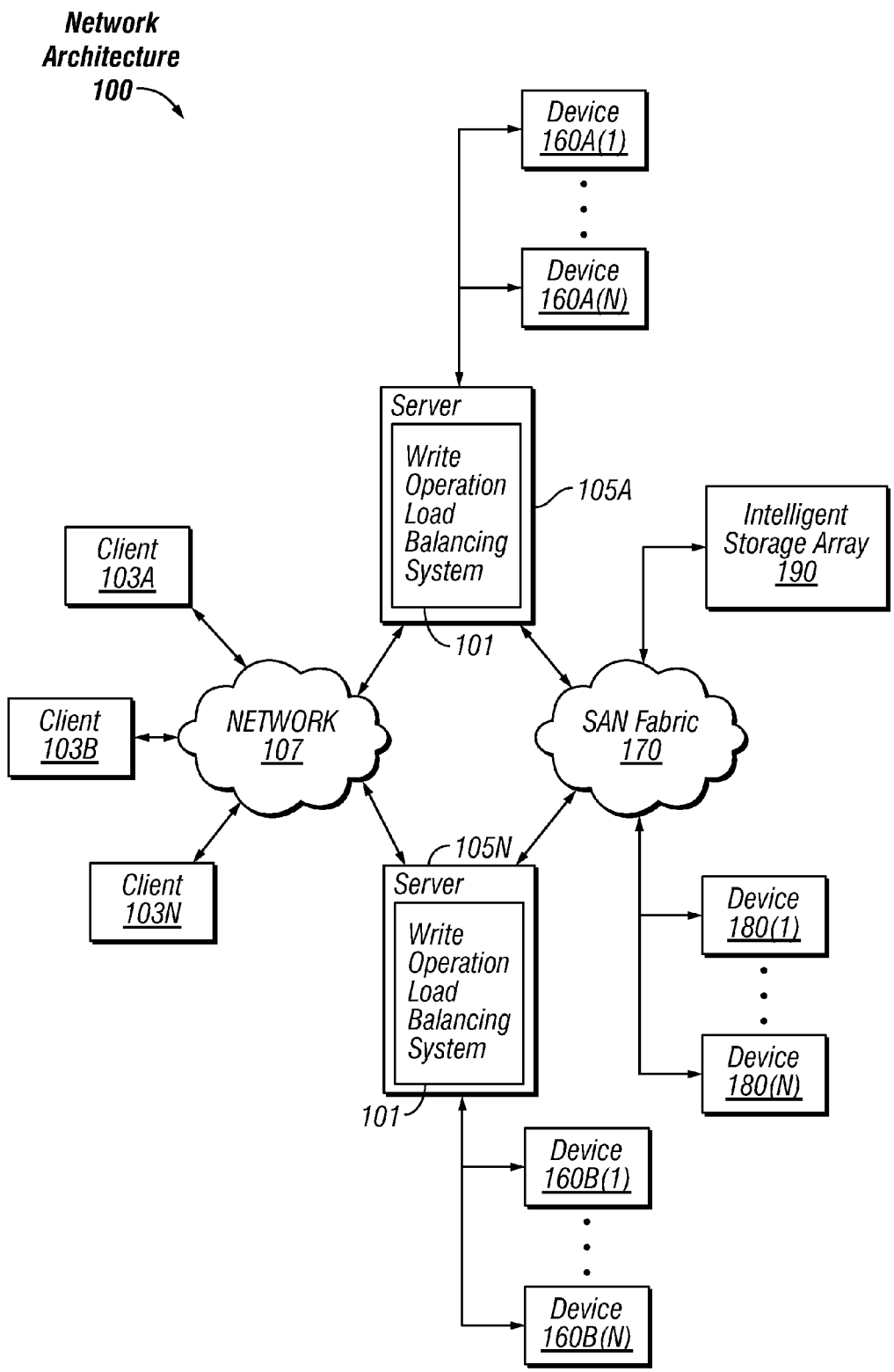
FIG. 1 is a block diagram of an exemplary network architecture in which a write operation load balancing system can be implemented, according to some embodiments.

FIG. 1 is a block diagram illustrating an exemplary network architecture 100 in which a write operation load balancing system 101 can be implemented. In the illustrated network architecture 100, client systems 103A, 103B and 103N, as well as servers 105A and 105N, are communicatively coupled to a network 107. A write operation load balancing system 101 is illustrated as residing on servers 105A and 103N, but in other embodiments the write operation load balancing system 101 can reside on a single computer 210 or be distributed between other multiple computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or mobile computing devices, comprising portable computer systems capable of connecting to a network 107 and running applications. Such mobile computing devices are sometimes referred to as smartphones, although some mobile phones not so designated also have these capabilities. Tablet computers are another example of mobile computing devices.

Although FIG. 1 illustrates three clients 103A-N and two servers 105A-N as an example, in practice many more (or fewer) computers can be deployed. In one embodiment, the network 107 is in the form of the internet. Other networks 107 or network-based environments can be used in other embodiments.

Figure 2:
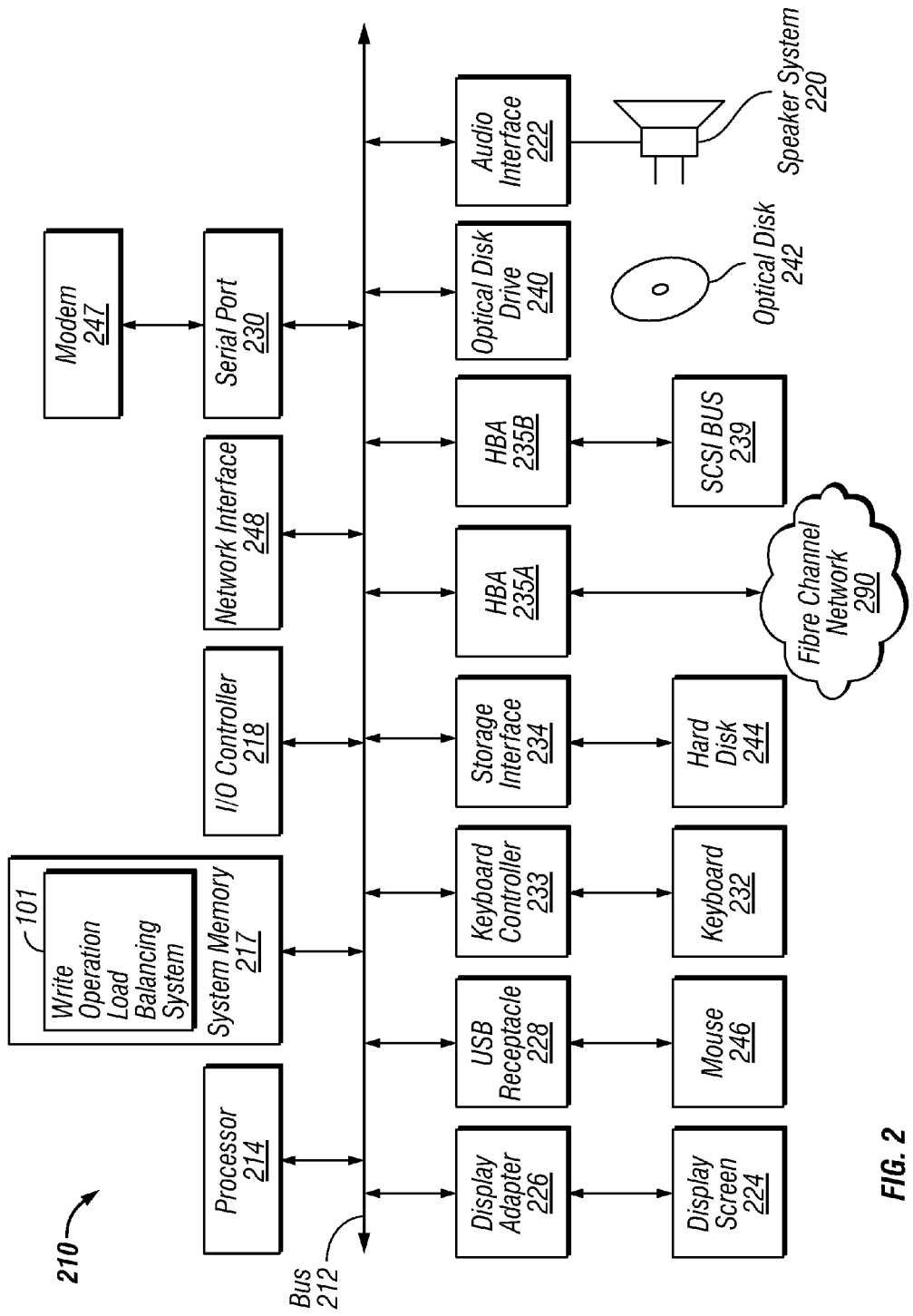
FIG. 2 is a block diagram of a computer system suitable for implementing a write operation load balancing system, according to some embodiments.

FIG. 2 is a block diagram of a computer system 210 suitable for implementing a write operation load balancing system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the write operation load balancing system 101 is illustrated as residing in system memory 217. The workings of the write operation load balancing system 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
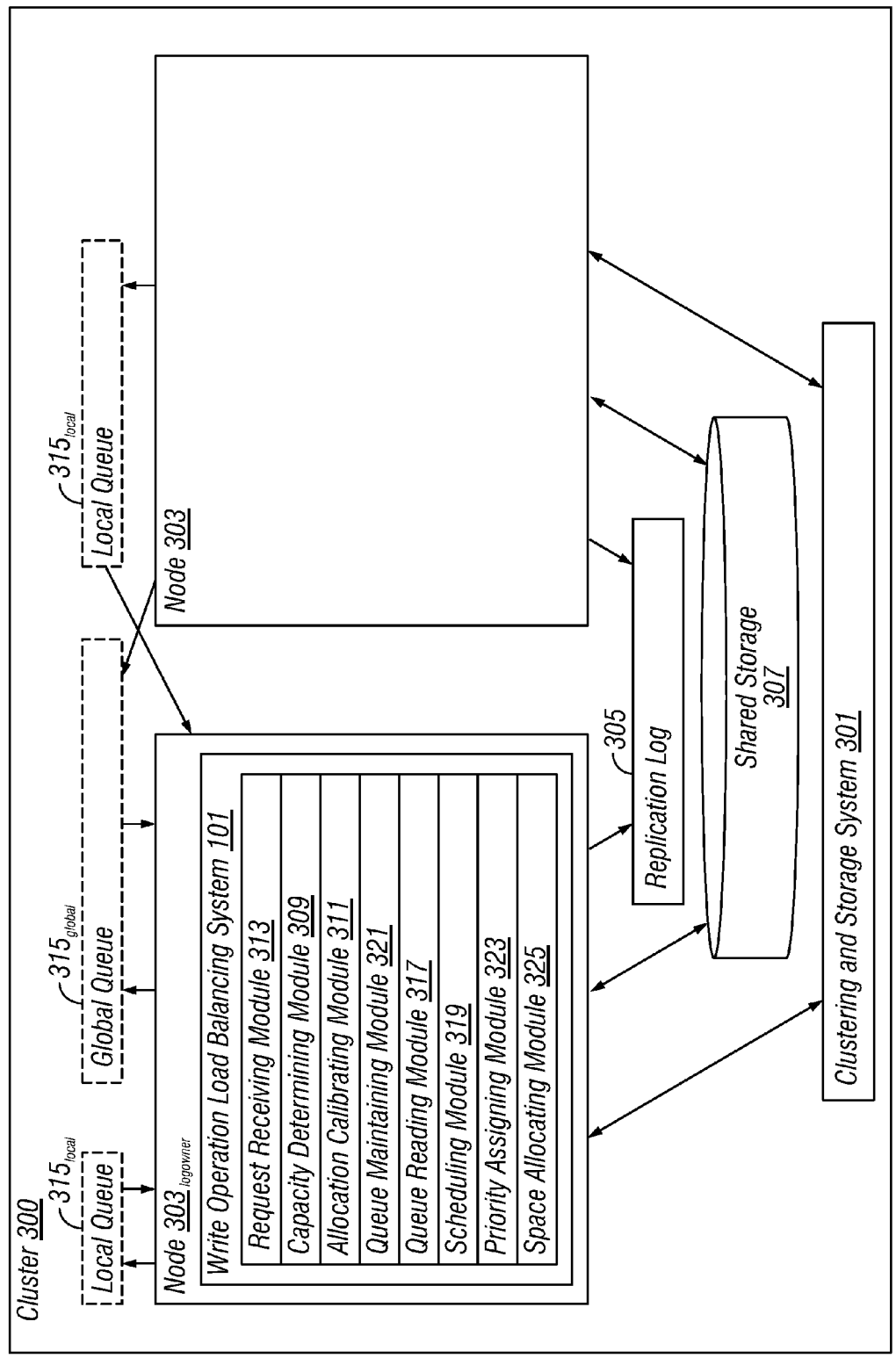
FIG. 3 is a block diagram of the operation of a write operation load balancing system, according to some embodiments.

As illustrated in FIG. 3, the write operation load balancing system 101 schedules the write operations of all of the nodes 303 in a cluster 300, so as balance the load of storage I/O operations efficiently, and prevent the types of delays, lock outs, I/O starvation and unfair treatments of different nodes 303 and difficulty prioritizing specific operations inherent in conventional clustering and storage environments that support data volume 405 replication. The write operation load balancing system 101 thus enables the utilization of the storage array and node processing capacity to the fullest.

FIG. 3 illustrates an instance of a write operation load balancing system 101 running on a logowner node $303_{logowner}$ of a cluster 300. As described above, the functionalities of the write operation load balancing system 101 can reside on a server 105, a client 103, or be distributed between multiple computer systems 210, including within a fabric/cloud-based computing environment in which the functionality of the write operation load balancing system 101 is provided as a service over a network 107. It is to be understood that although the write operation load balancing system 101 is illustrated in FIG. 3 as a single entity, the illustrated write operation load balancing system 101 represents a collection of functionalities, which can be instantiated as a single or multiple modules as desired (an instantiation of a specific, multiple module write operation load balancing system 101 is illustrated in FIG. 3). It is to be understood that the modules of the write operation load balancing system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the write operation load balancing system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

Figure 4:
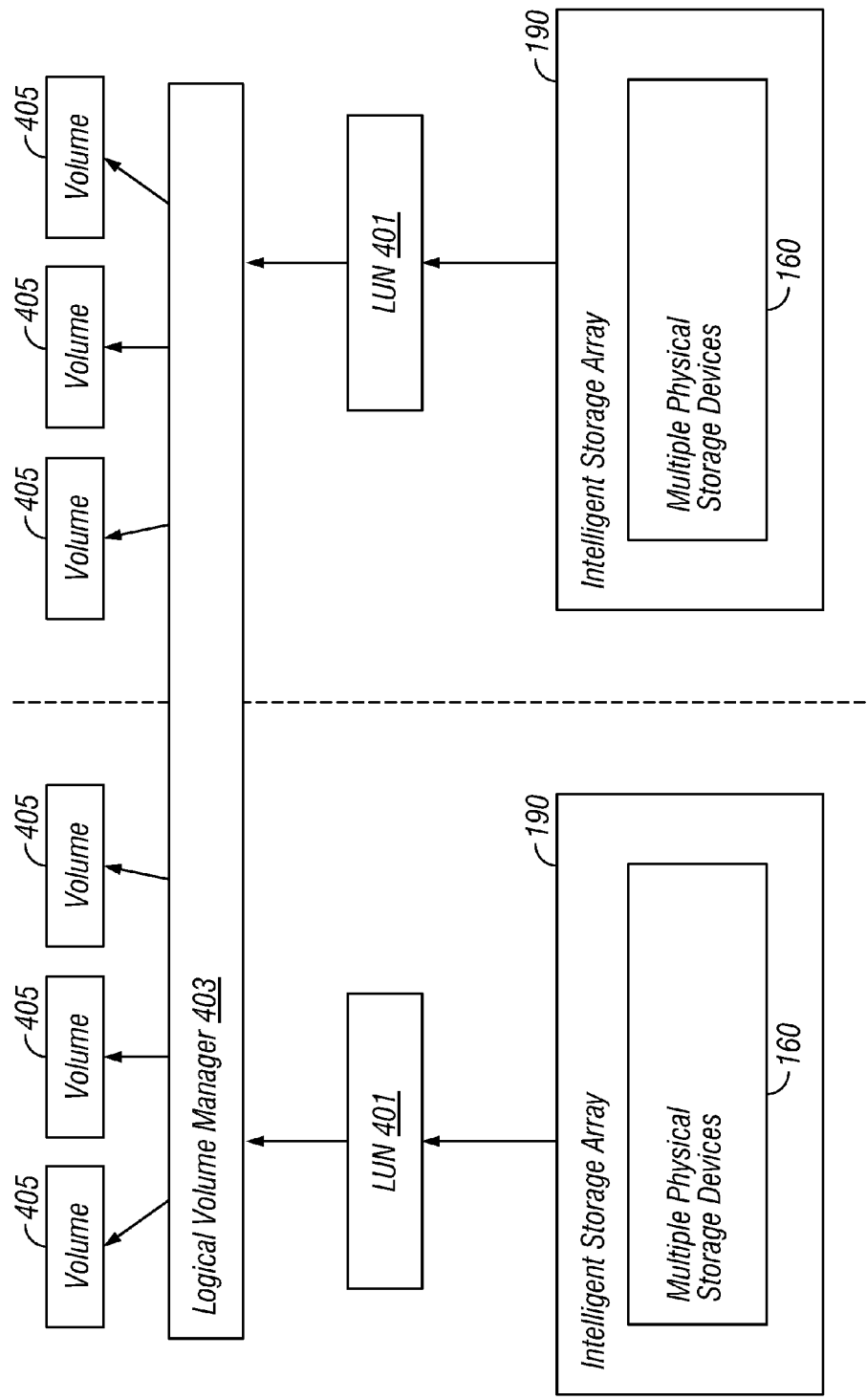
FIG. 4 is a block diagram of a shared storage architecture utilized by a write operation load balancing system, according to some embodiments.

FIG. 3 illustrates a cluster 300 instantiated in the context of a clustering and storage system 301 utilizing shared storage 307 and providing data volume 405 replication. For efficiency of illustration and explanation, the clustering and storage system 301 is illustrated as a centralized component residing outside of any node 303. It is to be understood that the clustering and storage system 301 represents a collection of functionalities, which in practice are typically instantiated as a plurality of components that are distributed throughout the cluster 300. The shared storage 307 is illustrated and described in conjunction with FIG. 3 as if it were a single storage device 160 with multiple volumes 405 (the volumes are illustrated in FIG. 4). In practice, the shared storage 307 is typically implemented with multiple underlying physical storage devices 160, which are managed by the clustering and storage system 301 so as to appear as a single storage device 160 with multiple volumes 405 to computer systems 210 accessing the shared storage 307. An example of the architecture of one such scenario according to one embodiment is illustrated in FIG. 4, which is discussed in more detail below.

FIG. 3 illustrates a cluster 300 containing one logowner node $303_{logowner}$, a replication log 305 and one additional node 303. Although FIG. 3 illustrates a cluster 300 of only two nodes 303, it is to be understood that a cluster 300 can contain more (and in some embodiments many more) than two nodes 303. Each node 303 can be instantiated as a physical/virtual host computer 210, for example of the type illustrated in FIG. 2. Although FIG. 3 illustrates the write operation load balancing system 101 as residing on the logowner node $303_{logowner}$ it is to be understood that some of the functionalities performed by the write operation load balancing system 101 can execute on other nodes 303 of the cluster 300. Note also that although the replication log 305 is used to replicate the data volumes 405 of the shared storage 307 to a secondary site, the secondary site and replication process are not illustrated because they are only tangential to the functionality of the write operation load balancing system 101 described herein.

FIG. 4 illustrates an example of a shared storage 307 architecture, according to some embodiments. Intelligent storage arrays 190 group multiple physical storage devices 160 into single logical units (LUNs) 401. Each LUN 401 appears as a single storage device 160 to an accessing node 303. The logical volume manager 403 of the clustering and storage system 301 can in turn provide software level logical volume management to create multiple logical volumes 405 on top of each LUN 401. Although Figure illustrates two LUNs 401 each of which is logically treated as three volumes 405, it is to be understood that clusters 300 can contain more or fewer LUNs 401, and that more or fewer logical volumes 405 can be built on top of a given LUN 401. It is also possible to create a single logical volume 405 from multiple LUNs 401 (not illustrated).

Returning to FIG. 3, in one embodiment the write operation load balancing system 101 optimizes write operations by controlling the allocation of space in the replication log 305 on a per node 303 basis calibrated to each node's write operation backlog capacity. More specifically, a capacity determining module 309 of the write operation load balancing system 101 determines the capacity of each node 303 to manage outstanding write requests. As noted above, due to static and dynamic storage stack variations between nodes 303, different nodes 303 of the cluster 300 have different upper limits in the number of outstanding I/O requests they can simultaneously manage without self-throttling. Even on an individual node 303, this upper limit varies over time, due to dynamic factors such as the current multipath state between the node 303 and the storage 307. Therefore, by determining current backlog capacities of the nodes 303 of the cluster 300, the write operation load balancing system 101 can calibrate the allocation of space in the replication log 305 to the various nodes 303 based on their capacities.

More specifically, a request receiving module 313 of the write operation load balancing system 101 receives the requests sent by each of the nodes 303 to the logowner $303_{logowner}$ for the allocation of space in the replication log 305 for write operations. When a request is received from a specific node 303, the capacity determining module 309 determines the current backlog capacity of the node 303 that made the request. An allocation calibrating module 311 of the write operation load balancing system 101 then calibrates the amount of space in the replication log to allocate to the determined current capacity of the specific node 303. The specific node 303 is only allocated enough space in the replication log 305 to execute the number of write operations in its backlog that the node 303 can manage without self-throttling. In other words, by limiting the allocation to accommodate no more than the node's upper limit for simultaneous write operation management from its backlog, the node's throttling of its backlogged operations above this limit is prevented. This prevents the node 303 from effectively I/O starving or locking other nodes 303 out of the replication log 305 until it is done processing its backlog, which is over the limit of what it can manage simultaneously without self-throttling. Recall that when a node 303 must throttle its own write operations, the rest of the nodes 303 in the cluster 300 must wait while the self-throttling node 303 completes the lengthy processing of clearing out its backlog. Because of the need to preserve write-order fidelity, the self-throttling node 303 must finish all of its backlogged write operations before the other nodes 303 of the cluster 300 can execute their own write operations for which space in the replication log 305 was subsequently assigned. On the other hand, by limiting the allocation to what each node 303 can process without throttling its own write operations, this highly undesirable form of cluster 300 wide storage I/O slowdown is avoided.

In one embodiment, the nodes 303 include information indicative of their current backlog capacities in their write slot allocation requests to the logowner node $303_{logowner}$. In other embodiments, the write operation load balancing system 101 polls the nodes 303 for this information, for example on a periodic basis as desired (the specific polling interval to use is a variable design parameter). The specific content and format of the information indicative of a node's current backlog capacity provided to the write operation load balancing system 101 can vary between embodiments. For example, in one embodiment the number of outstanding I/O requests and SCSI tag command queue are provided. More or less precise levels of information can be used in this context in different embodiments as desired. Likewise, the specific level of granularity at which a node's capacity to process backlogged write operations is determined varies between embodiments. In some embodiments, the capacity determining module 309 attempts to determine a specific current upper limit (which can be adjusted up or down, e.g., to account for a margin of error), and limits its allocation of space in the replication log 305 to the node 303 based on that number. In other embodiments, the capacity determining module 309 determines a node's backlog capacity with a lower degree of precision, for example looking only at the number outstanding I/O requests on the node 303, and allocating less space in the replication log 305 to nodes 303 with greater backlogs, based on the fact that a large number of outstanding I/O requests is indicative of latency.

In another embodiment, a queue maintaining module 321 of the write operation load balancing system 101 maintains a single global queue $315_{global}$ to schedule write operations for the entire cluster 300. In this embodiment, rather than making a write request to the logowner node $303_{logowner}$, all nodes 303 of the cluster, including the logowner node $303_{logowner}$, add their requests to execute write operations to the tail of the global queue $315_{global}$. A queue reading module 317 of the write operation load balancing system 101 reads the global queue $315_{global}$, and a scheduling module 319 of the write operation load balancing system 101 schedules the write operations according to the order of the queue $315_{global}$ (i.e., in strict first in first out order). Using the cluster level global queue $315_{global}$ to schedule the write operations prevents individual nodes 303 from monopolizing access to the replication log 305 with multiple successive write operations which have the effect of locking out and I/O starving other nodes 303. The global queue 315 based embodiment provides a completely fair scheduling of I/Os across the cluster 300, which is desirable when, for example, an application expects this level of fairness.

Under circumstances in which scheduling preferences between nodes 303 are desired, a per-node queue policy may be used. More specifically, rather than maintain a single global queue $315_{global}$ for the entire cluster 300, a separate local scheduling queue $315_{local}$ is maintained for each separate node 303, including the logowner node $303_{logowner}$. Each node 303 (including the logowner node $303_{logowner}$) adds its write requests to its own local queue $315_{local}$. This results in all write operations across the cluster 300 being queued up in the per-node queues $315_{local}$ maintained for each node 303. The scheduling module 319 then schedules write operations from the individual local queues $315_{local}$ according to one of various algorithms depending upon the desired levels of scheduling preference to be provided to different nodes 303.

In one embodiment the local queues $315_{local}$ are serviced according to a round robin scheduling approach. When scheduling write operations, depending upon the current available space in the replication log 305, the scheduling module 319 schedules an equal number of write operations from each node's queue $315_{local}$, regardless of the number of operations queued per node 303. For example, if during a given round of scheduling the replication log 305 can accommodate seventy five write operations, in the case of a three node 303 cluster 300, the twenty five operations first written to each node's queue $315_{local}$ are read therefrom, and the corresponding write operations are scheduled, regardless of the relative queue depths. Thus, each of the three nodes 303 has an equal number of write operations scheduled. The next round of write operation scheduling then divides the available space equally in the same manner (or substantially equally if the amount of space is not evenly divisible by the number of nodes 303 and/or queued requests). This approach provides the same level of scheduling preference to each node 303 in the cluster 300, regardless of queue depths.

The intervals at which to execute scheduling rounds is a variable design parameter, as is the specific formulas used to divide remaining slots when the available number is not evenly divisible by the number of nodes 303 with queued operations. Additionally, when the queues $315_{local}$ of one or more nodes 303 can be emptied without using their full share of the available space in the replication log 305, the remaining capacity is divided evenly among the other nodes 303.

In another per-node queue $315_{local}$ based embodiment, a max-queue scheduling algorithm is used. In this embodiment, the scheduling module 319 schedules write operations for the various nodes 303 in direct proportion to the number of requests pending per queue $315_{local}$. Thus, nodes 303 having queues $315_{local}$ with more pending requests are proportionately prioritized over those with fewer. For example, in a cluster 300 of four nodes (referred to in this discussion as nodes A, B, C and D), suppose the following queue depth for each node: A is 100, B is 1500, C is 150 and D is 250. If the replication log 305 currently has slots for 200 write operations, then 10 are scheduled from the queue $315_{local}$ of node A, 150 from node B, 15 from node C and 25 from node D respectively. Thus, each node 303 is given a level of scheduling priority in direct proportion to its number of pending write operations relative to that of the others.

It is to be understood that in other embodiments that utilize local per-node queues $315_{local}$ to balance write operation scheduling, different queue servicing algorithms can be utilized as desired. Additionally, in one embodiment an administrator or other authorized user can set or adjust priorities for specific nodes 303, e.g., by entering directives via an interface or the like. For example, the administrator can set and edit priority weights to apply to one or more nodes 303, and the level of scheduling preference provided to the specific node (s) 303 is set or adjusted in proportion to the entered weights.

In another embodiment, the write operation load balancing system 101 optimizes write operation scheduling on a per-volume basis. In this embodiment, a volume priority assigning module 323 of the write operation load balancing system 101 assigns different levels of priority to different data volumes 405. These assignments can be made or adjusted in response to directives received from an administrator (or, e.g., set by default at system installation). A space allocating module 325 of the write operation load balancing system 101 then allocates space in the replication log 305 to volumes 405 in proportion to their priorities. In other words, volumes 405 with higher priorities are assigned more space in the replication log 305. As a result, writes to higher priority volumes 405 are processed at higher levels of priority than those with lower priorities, and thus execute more quickly all else being equal. This enables applications to target their synchronous and other highly latency sensitive write operations to higher priority volumes 405, and their asynchronous and other lower priority write operations to lower priority volumes 405. For example, in a database management application, I/Os to control files and redo volumes would be given higher priority than I/Os to data files and archive logs. In another embodiment, rather than applications targeting their write operations to specific volumes 405 based on priority, the requests themselves contain information indicative of the priority of the corresponding write operations (e.g., in a header), and the write operation load balancing system 101 schedules them accordingly (e.g., by directing high priority operations to a high priority volume 405).

Figure 5:
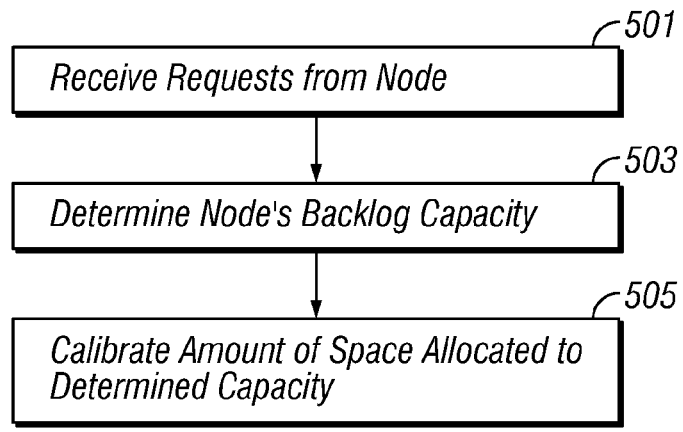
FIG. 5 is a flowchart of the operation of a write operation load balancing system, according to some embodiments.

FIG. 5 illustrates steps of the operation of a write operation load balancing system 101, according to some embodiments. The request receiving module 313 receives 501 requests from nodes 303 of the clustering and storage environment 301 for allocation of space for write operations in the replication log 305. In response to receiving a request, the capacity determining module 309 determines 503 the current capacity of the requesting node 303 to manage its backlog without throttling execution of its own write operations. The allocation calibrating module 311 calibrates 505 the amount of space allocated in the replication log 305 to the node's current capacity.

Figure 6:
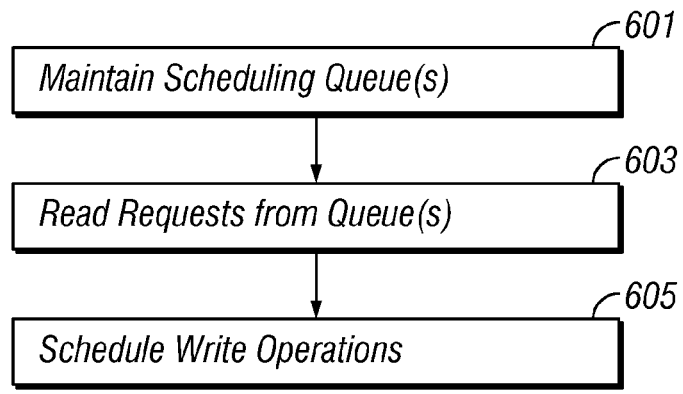
FIG. 6 is a flowchart of the operation of a write operation load balancing system, according to other embodiments.

FIG. 6 illustrates steps of the operation of a write operation load balancing system 101, according to other embodiments. The queue maintaining module 321 maintains 601 either a single global scheduling queue $315_{global}$ for all of the nodes 303 of the clustering and storage environment 301, or a separate local scheduling queue $315_{local}$ for each node 303. The queue reading module 317 reads 603 requests to schedule write operations from the single global queue $315_{global}$ or from the separate local scheduling queues $315_{local}$. The scheduling module 319 schedules 605 the write operations accordingly, thereby providing either a fair scheduling for each node 303 or specific levels of scheduling priority to specific nodes 303.

Figure 7:
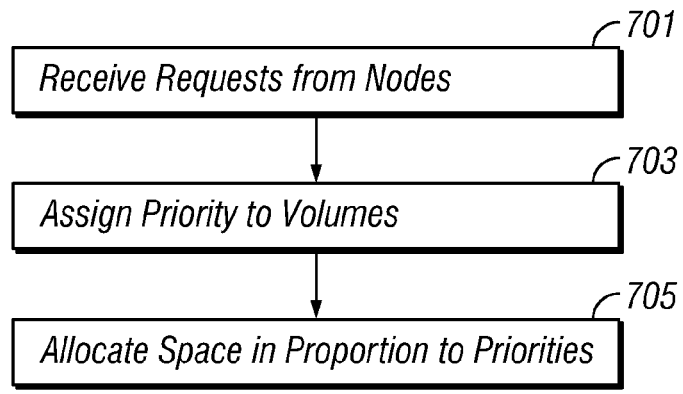
FIG. 7 is a flowchart of the operation of a write operation load balancing system, according to yet other embodiments.

FIG. 7 illustrates steps of the operation of a write operation load balancing system 101, according to yet other embodiments. The request receiving module 313 receives 701 requests from nodes 303 for allocation of space in the replication log 305. The volume priority assigning module 323 assigns 703 a separate scheduling priority to each data volume 405 of the shared storage 307. The space allocating module 325 then allocates 705 space in the replication log 305 to volumes 405 in proportion to their priorities.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for scheduling write operations of a plurality of nodes, thereby balancing a load of storage input/output operations in a clustering and storage environment that utilizes shared storage and supports replication of data volumes, the method comprising the steps of:

receiving, by a computer, requests from nodes of the clustering and storage environment for allocation of space for write operations in a replication log, wherein nodes perform write operations by writing first to the replication log and subsequently to the shared storage, wherein an order of write operations to the replication log matches an order of write operations to the shared storage, and wherein the clustering and storage environment utilizes the order and content of write operations to the replication log to replicate the data volumes of the shared storage to a secondary site, thereby preserving write-order fidelity;

responsive to receiving a request from a specific node for the allocation of space in the replication log, determining, by the computer, a current capacity of the specific node to manage a backlog of write operations without throttling execution of its own write operations; and calibrating, by the computer, an amount of space in the replication log to allocate to the determined current capacity of the specific node.

2. The method of claim 1 wherein calibrating an amount of space in the replication log to allocate to the determined current capacity of the specific node further comprises:

allocating the specific node only enough space in the replication log to execute a number of backlogged write operations that the specific node can simultaneously manage without throttling its own write operations.

3. The method of claim 1 wherein calibrating an amount of space in the replication log to allocate to the determined current capacity of the specific node further comprises:

limiting allocation of space in the replication log to an upper limit of the specific node for simultaneous backlogged write operation management, thereby preventing the specific node from throttling its backlogged write operations above the upper limit.

4. The method of claim 1 wherein determining a current capacity of a specific node to manage a backlog of write operations without throttling execution of its own write operations further comprises:

gleaning information indicative of the current capacity of the specific node from a request received from the specific node for allocation of space for write operations in the replication log, wherein each received request for allocation of space in the replication log further comprises information indicative of the current capacity of the requesting node.

5. The method of claim 4 wherein the information indicative of the current capacity of the requesting node in received requests further comprises:

a number of outstanding storage input/out requests pending on the node, and the node's Small Computer System Interface ("SCSI") tag command queue.

6. The method of claim 1 wherein receiving requests from nodes of the clustering and storage environment for allocation of space for write operations further comprises:

receiving requests from nodes of the clustering and storage environment for allocation of space for write operations, each one of said received requests further comprising information indicative of a priority of the corresponding write operation; and scheduling write operations at a level of priority indicated in corresponding received requests.

7. The method of claim 1 wherein determining a current capacity of a specific node to manage a backlog of write operations without throttling execution of its own write operations further comprises:

periodically polling each one of the plurality of nodes for information indicative of the current capacity of the specific node.

* * * * *